(12) United States Patent
Piatt et al.

(10) Patent No.: US 6,944,334 B2
(45) Date of Patent: Sep. 13, 2005

(54) COLOR CROSS REFERENCE SELECTION SYSTEM AND METHOD

(75) Inventors: Michael J. Piatt, Dayton, OH (US); Terry Wozniak, Springfield, OH (US); Joseph Mangan, Granger, IN (US)

(73) Assignee: Eastman Kodak Company, Rochester, NY (US)

( * ) Notice: Subject to any disclaimer, the term of this patent is extended or adjusted under 35 U.S.C. 154(b) by 590 days.

(21) Appl. No.: 09/775,454

(22) Filed: Feb. 1, 2001

(65) Prior Publication Data

US 2002/0102019 A1 Aug. 1, 2002

(51) Int. Cl.[7] .............................................. G06K 9/00
(52) U.S. Cl. ...................... 382/167; 382/165; 345/590; 358/518; 358/520; 358/525
(58) Field of Search ................................ 382/162, 165, 382/167; 345/589–592, 600–602, 606–610; 358/501–505, 518–520, 525

(56) References Cited

U.S. PATENT DOCUMENTS

| | | | | |
|---|---|---|---|---|
| 4,658,286 A | * | 4/1987 | Schwartz et al. | 348/179 |
| 5,450,216 A | * | 9/1995 | Kasson | 358/518 |
| 5,506,946 A | * | 4/1996 | Bar et al. | 345/600 |
| 5,731,818 A | * | 3/1998 | Wan et al. | 345/590 |
| 5,949,967 A | * | 9/1999 | Spaulding et al. | 358/1.9 |
| 5,982,992 A | * | 11/1999 | Waldron | 358/1.9 |
| 5,999,703 A | * | 12/1999 | Schwartz et al. | 358/1.9 |
| 6,075,888 A | * | 6/2000 | Schwartz | 382/167 |
| 6,154,217 A | * | 11/2000 | Aldrich | 345/589 |
| 6,313,925 B1 | * | 11/2001 | Decker et al. | 358/1.9 |
| 6,803,956 B1 | * | 10/2004 | Hirono | 348/272 |

* cited by examiner

Primary Examiner—Bhavesh M. Mehta
Assistant Examiner—Yubin Hung
(74) Attorney, Agent, or Firm—Barbara Joan Haushalter

(57) ABSTRACT

A system and method are proposed for the printing of all possible colors, including all permutations of primary inks used to make processed colors, in equal increments and of a size easily measurable with a device that will convert the colors into standard color coordinates. These colors are categorized and used to determine the ability of the output device to reproduce a source color. Each color printed within the gamut of an output device is identified and correlated to independent color coordinates. The primary color recipe necessary to reproduce a reference color within the gamut of the output device is identified. The magnitude of deviation of out of gamut source colors is determined, and the closest in gamut colors are specified through methods of interpolation and nearest neighbor. Furthermore, the alteration in gamut size can be predicted based upon image manipulation processes associated with the workflow. Source colors can be correlated to the altered destination gamut in order to determine the recipe of in gamut colors. An extension of this functionality teaches a method for determining the type, and the extent, of pre-process workflow alterations necessary to maintain or eliminate a source color from the color set of the output device. A set of source colors is correlated to a companion set of the output device in gamut colors, by dependent interpolated adjustment of the set with regard to hue, saturation, and lightness, rather than an absolute value nearest match.

13 Claims, 5 Drawing Sheets

COLOR CROSS REFERENCE SELECTION SYSTEM AND METHOD

TECHNICAL FIELD

The present invention relates to printing and identifying color pallets within a specified gamut and, more particularly, to relating those colors, through an independent color coordinate system, to alternate cross referenced color data.

BACKGROUND ART

Various techniques are known for digital printers to provide continuous tone (monochrome or color) printing. These techniques include ordered drop dispersion patterns, the building of dot clusters (which look similar to conventional offset halftone printing and are typically printed with very high resolution digital printers such as 1200 dpi), and stochastic (error diffusion) screening.

Digital printing devices are capable of imaging many combinations of primary colors to produce a variety of processed colors. This color set is referred to as the printer gamut. In the case of printers, this set is often ink and media specific. The printer gamut typically consist of thousands of uniquely discernable colors.

Digital printing technology is advancing at a rapid rate. Market acceptance of a number of digital imaging technologies has increased as these technologies become more reliable and convenient to use. Not unlike traditional analog based printing methods, such as photographic techniques, digital imaging quality is highly susceptible to the processing steps performed prior to imaging the digital file.

Color matching is not a new endeavor. Several years ago, the International Color Consortium established standards for mapping one gamut into another. The process involves the generation of a tag file that accompanies the image file. This tag file provides information required to map an entire color gamut from device into that of another. There are several disadvantages of this system. First of all, specific colors are not mapped exactly. Compromises are made to accommodate the entire color set and direct it into the new gamut. Secondly, there is no feedback of the error associated with individual color mapping. Further, there is no way to account for variations in the workflow once the profiles for each device are generated. It is a necessary requirement that the image processing steps remain fixed in order for the profiles to be valid. Finally, there is no predictive capability within the ICC color matching process that will inform a user what transformations are necessary to assure accurate color matching of individual spot colors.

Having the ability to correlate the printed color response to a known input would be very valuable. It would allow one to predict, ahead of time, the color response of the system to a known input. Further, knowing the effects of workflow modifications on printed output would increase the ability to correlate the cause and effect relationships between desired and achieved color fidelity. It would be desirable, therefore, to be able to define the gamut and select specific colors within the gamut based on external criteria. Correlation between color standards, such as Pantone colors, is one such example. Another example is the need to determine if a specific color measured, by a spectrophotometer, is within the gamut of the output device. However, it would be desirable to be able to reproduce a color or set of colors based on an altered gamut of the output device as affected by known preprocessing of image data.

SUMMARY OF THE INVENTION

The present invention relates to how the gamut of the output device can be altered and/or limited by image processing steps involved in the workflow. The altered gamut is predicted and used as the basis for the cross correlation to colors one wishes to print. The techniques of the present invention resolve each of the problematic color matching issues with the ICC methodology.

In accordance with one aspect of the present invention, a system is provided for correlating an individual color or a set of source colors with the appropriate individual or set of destination colors using interpolation of an established data base of the destination color gamut and predictive alteration of the destination gamut based upon digital data manipulation processes. The present invention further defines individual or set color matching methods applicable to any destination device based upon interpolation and considerations of digital image processing.

Other objects and advantages of the invention will be apparent from the following description, the accompanying drawings and the appended claims.

DETAILED DESCRIPTION OF THE PREFERRED EMBODIMENTS

The present invention discloses the printing of all possible colors, including all permutations of primary inks used to make processed colors, in equal increments and of a size easily measurable with a device that will convert the colors into standard color coordinates. These colors are categorized and used to determine the ability of the output device to reproduce a source color. Each color printed within the gamut of an output device is identified, via a unique label, and correlated to independent color coordinates. The primary color recipe necessary to reproduce a reference color within the gamut of the output device is identified, using color coordinates and the unique label to categorize the colors. The magnitude of deviation of out of gamut source colors is determined, and the closest in gamut colors are specified through methods of interpolation and nearest neighbor. Furthermore, the alteration in gamut size can be predicted based upon image manipulation processes associated with the workflow. Source colors can be correlated to the altered destination gamut in order to determine the recipe of in gamut colors. An extension of this functionality teaches a method for determining the type, and the extent, of pre-process workflow alterations necessary to maintain or eliminate a source color from the color set of the output device. Hence, with the present invention, the best in gamut color match is determined, based on established perceptual color algorithms rather than pure interpolation to nearest color, within an independent color coordinate system. Finally, the present invention defines a method for correlating a set of source colors to a companion set of output device in gamut colors, by proper dependent interpolated adjustment of the set with regard to hue, saturation, and lightness, rather than an absolute value nearest match.

Figure 1:
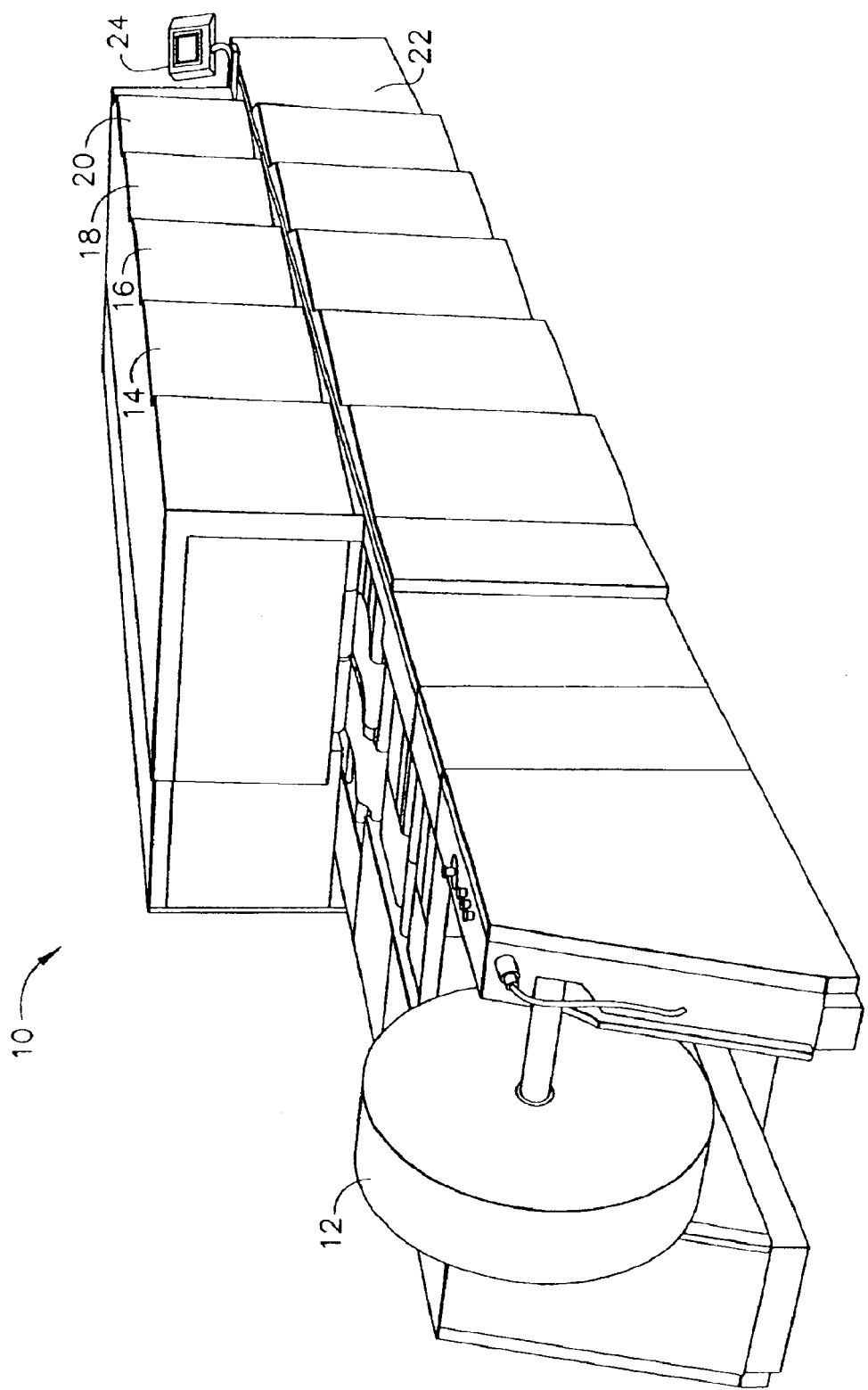
FIG. 1 illustrates a high speed color press suitable for implementing the technique of the present invention.

Referring now to the drawings, an exemplary high speed digital color press is shown in FIG. 1. The high speed color press 10 of FIG. 1 is used for illustrative purposes only, to describe the techniques of the present invention. However, it will be obvious to those skilled in the art that the inventive aspects herein are not limited to particular colorants, or even specifically to a printing system destination device.

In FIG. 1, the supply paper roll 12 passes under the primary color imaging stations 14, 16, 18 and 20. Digital imaging data from the data system 22 is sent to the imaging printheads via the system controller 24. A high speed digital ink jet printer 10 such as is shown in FIG. 1, typically prints with the primary ink colors cyan, magenta, black, and yellow.

Figure 2:
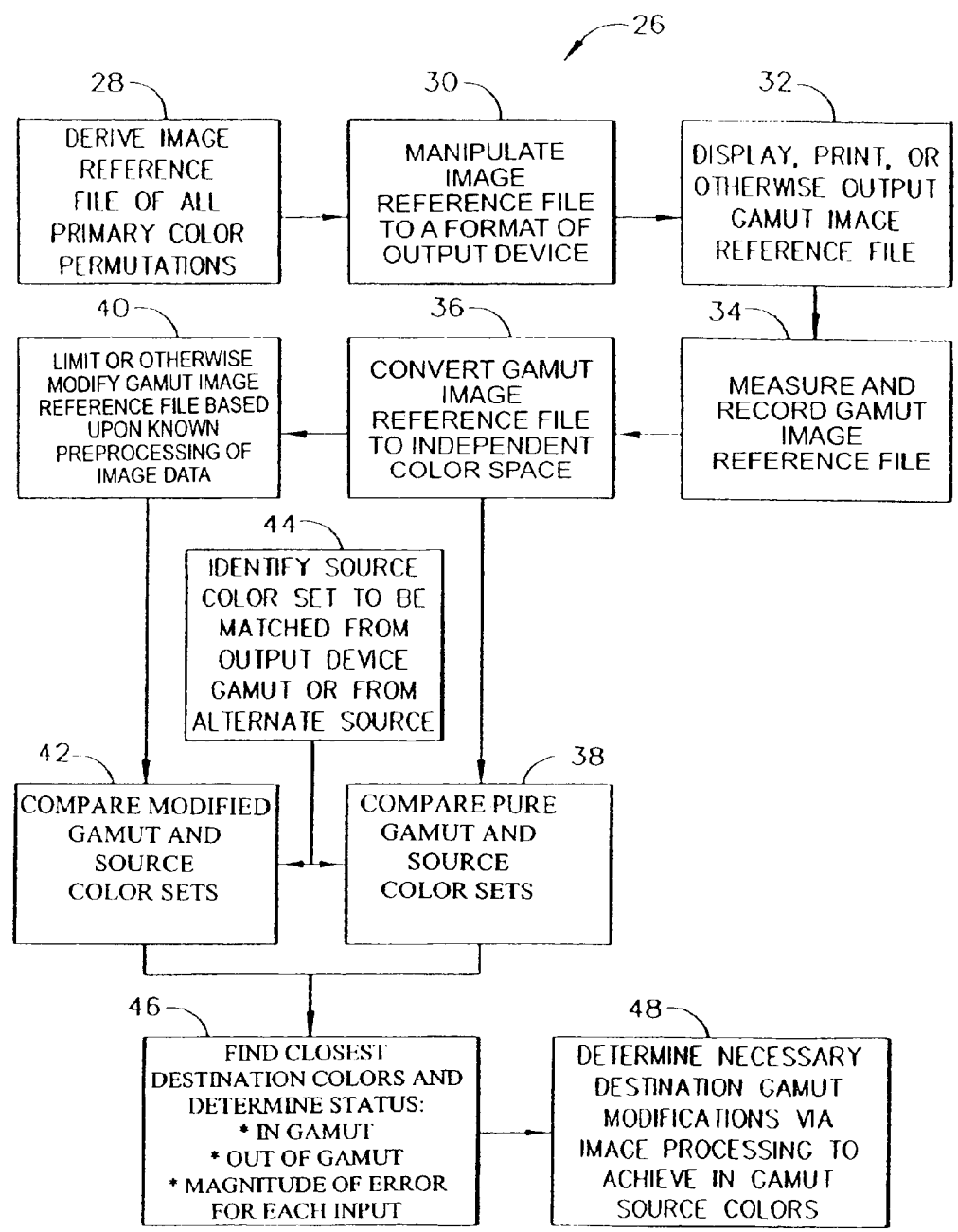
FIG. 2 is a block diagram illustrating the process of defining, printing, and measuring a reference file for the purpose of comparison against a source color, in accordance with the present invention.

Referring now to FIG. 2, there is illustrated a block diagram 26 of the process of defining, printing, and measuring a reference file, for the purpose of comparison against a source color, in accordance with the present invention. Initially, as shown at block 28, a digital file is generated that represents all permutations of different percentages of the different primary colors used in the system. Although there are an infinite number of such combinations, for practical purposes it has been determined experimentally that somewhere between five thousand and ten thousand colors is sufficient to define the total printable color gamut of a high speed digital ink jet press.

Once determined, this digital file is manipulated as indicated at block 30 to the format of the output device. The image reference file is processed to assure the maximum limits of the gamut are imaged from this file. The data processing is tailored so that it does not limit the ink saturation of the primary colors. This limiting process is typical a necessary condition for good print quality as a function of the printed substrate for the purpose of preventing excessive bleed of the inks or penetration of the ink through the substrate.

At block 32, a gamut image reference file is displayed, printed or otherwise output. For example, the gamut image reference file can be printed in a grid arrangement of color patches. Each printed color patch is a unique combination of the primary inks cyan, magenta, yellow, and black. Each of the color patches is assigned a unique identifier based upon its position in the matrix. Further, each color patch is of sufficient physical size to facilitate automatic measurement with a spectrophotometer system. A typical automated spectrophotometer system will have a light spectrum reading head connected to a translation stage that allows two dimensional movement of the sensor head over the print surface. As shown by block 34, each of the color patches on the print surface is read by the instrument, stored in a data base, and converted, at block 36, into independent color coordinates. After converting the pure gamut data to independent color space at block 36, the pure source and the destination color sets can be compared at block 38.

Figure 3:
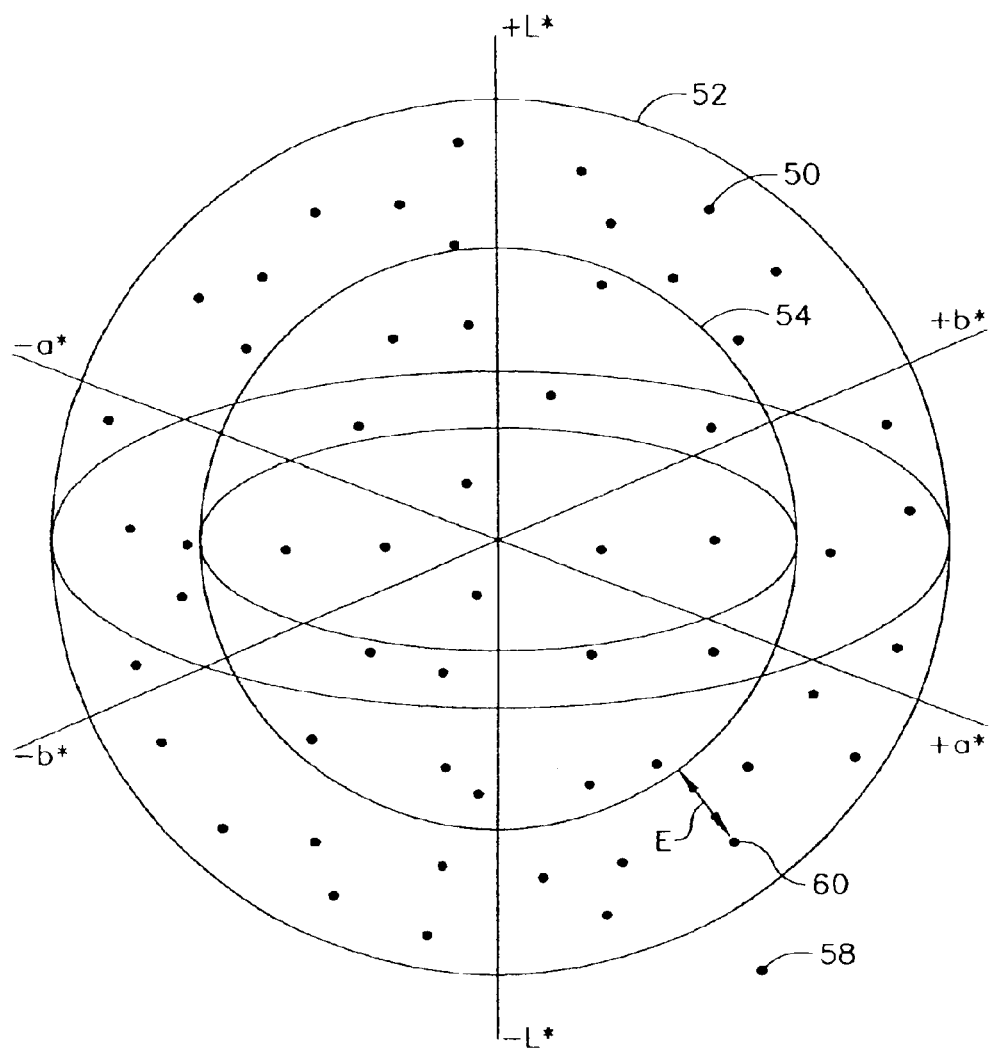
FIG. 3 is a graphic representation of gamut sampled color.

A graphic representation of the gamut sampled data is shown in FIG. 3. The points 50 in the gamut are spaced at a relatively equal distance apart. This is a desirable condition to achieve maximum accuracy of interpolated points between those actually recorded. Often, it is not possible to use the entire gamut of the output device for actual image data because of other limitations. One such limitation is the interaction between aqueous inks and paper substrate. This interaction requires image processing to limit the dynamic range, or total ink coverage, of each of the primary inks in order to assure the processed colors will print correctly. The full destination gamut is shown as encompassed by 52 in FIG. 3, while the reduced destination gamut is represented as 54.

Figure 4:
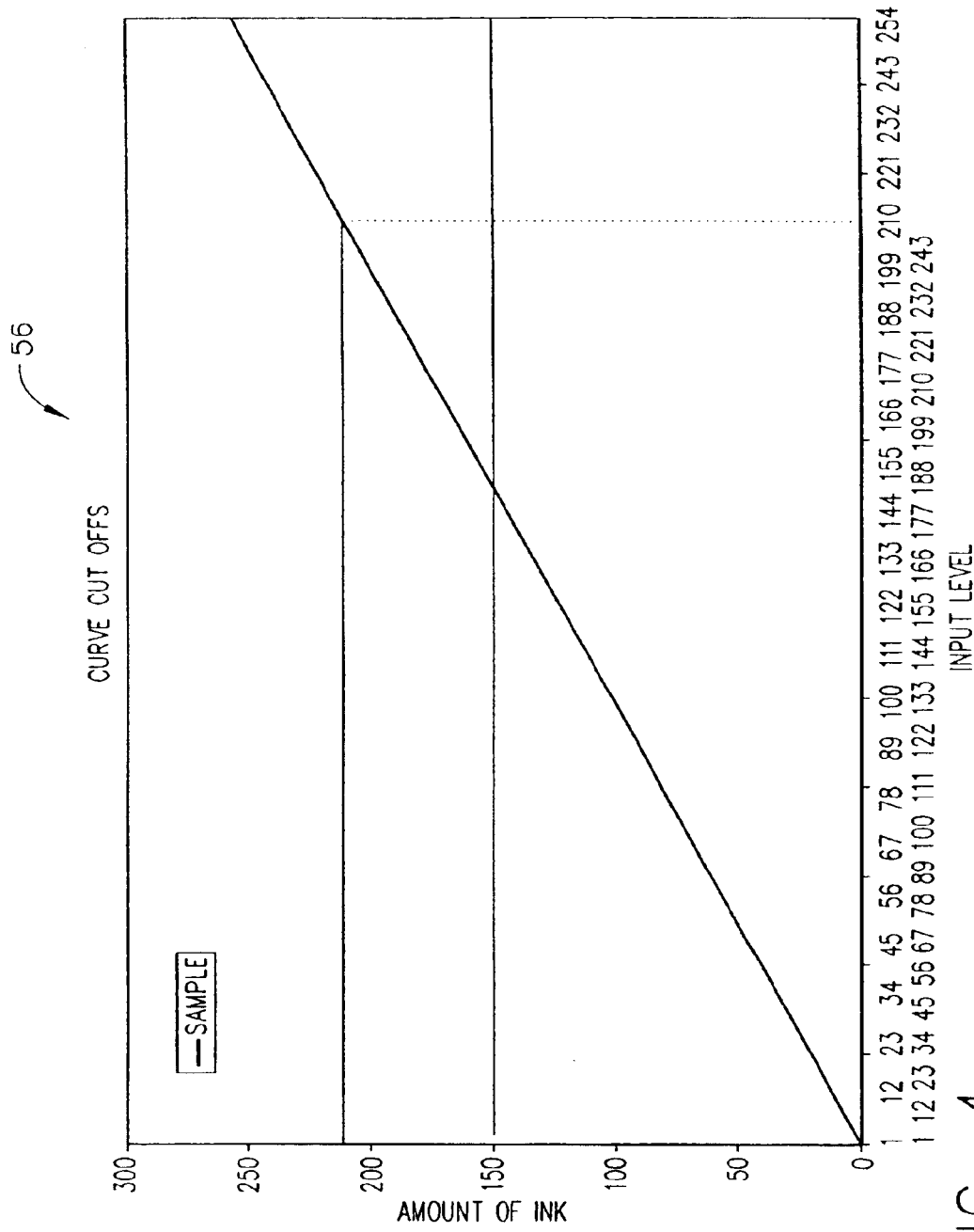
FIG. 4 is a graphic representation of accomplishing ink volume attenuation through the use of one dimensional transforms acting on each of the primary inks independently.

One way to accomplish ink volume attenuation is through the use of one dimensional transforms acting on each of the primary inks independently. A graph of this scheme is shown in FIG. 4. It can be seen from graph 56 that the 8 bit digital tone scale has already been linearized with respect to applied ink by a previous process. This graph illustrates that the maximum allowable ink printed must be reduced to some predetermined level. There is a corresponding decrease in density at this reduced inking level. Hence, the overall color gamut of the device is reduced accordingly. The available dynamic range of ink loading is referenced to the full range of digital input values. This is done to assure maximum graduation of tone over the usable range.

Performing this transfer function has a detrimental effect on color gamut. Therefore, the present invention determines the maximum gamut of the output device, as well as the level of attenuation in full three dimensional color space, that results from limiting individual colorant inking levels. The predictive nature of the present invention allows for the determination of the required ink density, and corresponding transformations, necessary to force a specific input color to lie inside of the volume defining the output device color space.

Returning now to FIG. 2, when the pure gamut data is converted, it can be limited or otherwise modified at block 40, such as when the entire gamut of the output device is not usable. The limiting or modification is based on known preprocessing of the image data. After limiting the gamut at block 40, the modified source and destination color sets can be compared at block 42. Both comparisons at block 38 and block 42, use the step of block 44. At block 44, the source color set is identified to be matched from the output device gamut or from an alternate source. The comparisons result in a determination of the closest destination colors, at block 46. The status is then identified as in gamut, out of gamut, or the magnitude of error. The present invention, therefore, is capable of determining a closest usable color match by comparing a source color with the reduced destination gamut, as well as determining a closest match between the source color and the full color gamut. The actual closest match does not consider the limitations of the output device, while the reduced destination gamut has incorporated such limitations into the determination of closest usable match. Hence, the closest match and the closest usable match may not always be the same. The magnitude of error between the two is then calculable.

Once the data base of the full gamut of the destination device is known, alternate subsets of this gamut can be determined by grouping the data base into subsets as determined by the amount of individual inks required to obtain a specific color. In so doing, it is also possible to determine the minimum ink levels required to obtain a specific color and the errors associated with colors outside of the gamut. FIG. 3 illustrates an out of gamut color point at 58. Point 60 shows a color that is inside the full destination gamut but outside the reduced destination gamut. The error distance is designated as E. The error is measured as the Euclidian distance in an independent color coordinate system from the desired color and the closest obtainable color within the gamut of the destination device. The error analysis reporting structure is defined as the Euclidian distance E between a desired color and an actual color in an independent color coordinate system. This is not always consistent with human perception of the best possible color match. Sometimes the perceptual best match is not the closest point in the color space. It is straight forward for one skilled in the art to bias color match selection in the direction of human perception. Algorithms to accomplish biasing measured data with human perception functions to improve color matching accuracy are well known in the art. The present invention is consistent with the use of these methods by proposing to match spot colors or sets of spot colors as accurately as possible.

Continuing with FIG. 2, at block 48 the necessary destination gamut modifications via image processing to achieve in gamut source colors is determined. In accordance with the present invention, therefore, a system and method are defined for correlating an individual color or a set of source colors with the appropriate individual or set of destination colors. This is accomplished using interpolation of an established data base of the destination color gamut and predictive alteration of the destination gamut based upon digital data manipulation processes. The formed gamut, also called the second reduced gamut, is the original reduced gamut made larger because of the inclusion of selected source color determined from the comparison. FIG. 2 also illustrates the concept of gamut limiting and the steps necessary to estimate errors and predict modifications to the image processing steps to assure inclusion of a source color in the destination gamut.

The gamut limiting transformation of reduced inking level is discussed here for illustrative purposes only. It will be appreciated by those skilled in the art that other data manipulation techniques, such as reduction of continuous tone data to binary data through droplet dispersion techniques, can also make use of the inventive features disclosed here, without departing from the scope of the invention.

Figure 5:
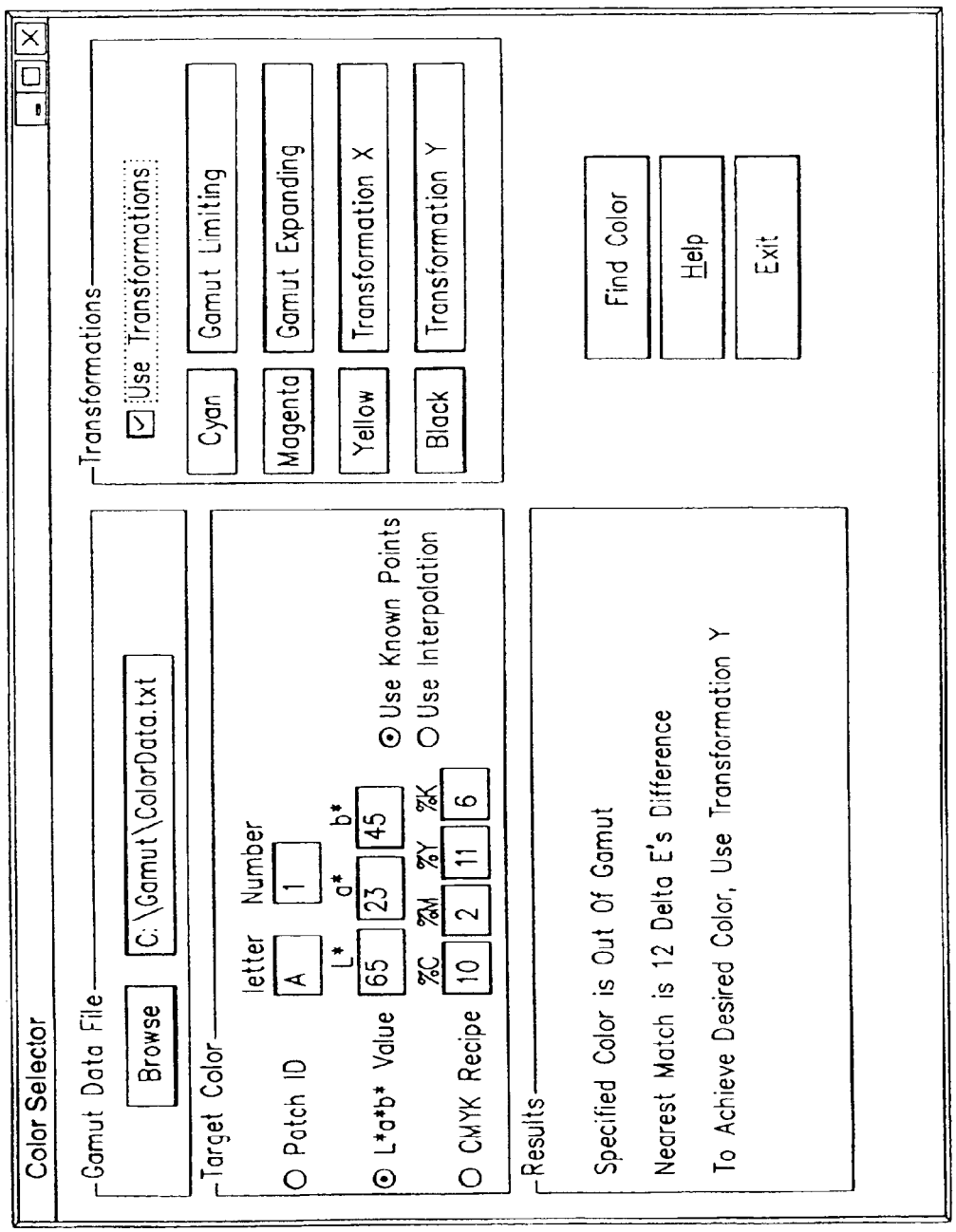
FIG. 5 is an example of a user interface for the color selection in accordance with the present invention.

A reduction to practice of the concepts disclosed herein can be predicated upon software implementation. An example of a user interface is shown in FIG. 5. User input of any one of the three parameters including Patch Identification Number, L*a*b* value, or CMYK recipe, will instigate the creation of the other two. The results section of the representative display screen of FIG. 5 provides feedback on in gamut/out of gamut status. Further explained in the results section is novel feedback, showing the required transformation to force the source color into the destination gamut. The right hand side of the user interface screen representation shown in FIG. 5 identifies the transformations applied to each color in the workflow used to derive the gamut that is paired with the patch ID, L*a*b* color coordinates, and the primary color ink recipe. The Patch ID is always taken directly from the pure gamut of the destination device as is illustrated in the block diagram of FIG. 2. The gamut data file shown at the top of the representative user interface display of FIG. 5, is a data base of the pure gamut of the destination device. In the example used here for illustration purposes, the gamut data file is a roster of all the measured colors printed and measured on a high speed digital press using primary inks of cyan, magenta, black, and yellow on a specific paper type.

Although the description herein has centered around the identification of a single color, it will be obvious to those skilled in the art that the concepts of the present invention can be applied also to multiple color identification. Identification of a single color is useful when it is desired, for example, to match a logo color or a specific corporate color on a defined output device, such as a digital color press.

However, it may also be desirable at times to match and print a set of complementary colors. These colors may be close enough to each other that they will all map to the same in gamut color coordinates. Printing this set will result in no discernable difference between the printed colors. It can be appreciated by one skilled in the art that the techniques described here can be extended to handle a set of dependant colors. Applying the technique of the present invention, the colors within the set remain unique, while the entire group is matched to the closest in gamut average value. Similarly, other rules can be applied to a set of colors. For example, two colors in a set may be forced to the maximum extremes of each other within the gamut of the destination device. As another example, a set of colors may be forced to comply in hue angle and vary only in lightness. Additional rules that force the average color to be the closest match within the output device gamut, combined with rules that force each of the colors in the set to maintain their relative colorimetric difference can be very advantageous. The possibilities are limitless. The present invention teaches that specific colors are mapped from one gamut to another under the conditions of specific rules while taking into account gamut alterations as a function of image processing.

The invention has been described in detail with particular reference to certain preferred embodiments thereof, but it will be understood that modifications and variations can be effected within the spirit and scope of the invention.

What is claimed is:

1. A method for selecting a cross reference color match for outputting to an output device, the method comprising the steps of:
   a. identifying a full color gamut of the output device;
   b. reducing the full color gamut to a first reduced color gamut;
   c. comparing a source color to the first reduced color gamut and the full color gamut to determine a value that is closest to the source color in each gamut;
   d. determining if the value is outside the reduced gamut, but inside the full color gamut; and
   e. forming a second reduced gamut that is larger in size than the first reduced gamut.

2. A method as claimed in claim 1 wherein the step of determining if the value is outside the reduced gamut, but inside the full color gamut comprises the step of comparing a modified source color and the reduced destination gamut.

3. A method as claimed in claim 1 further comprising the step of comparing the source color against the full color gamut of the output device to determine a closest match between the source color and the full color gamut.

4. A method for identifying a primary color recipe necessary to reproduce a reference color within a gamut of an output device comprising the steps of:
   a. using image data to modify the gamut of the output device using image processing;
   b. using the modified gamut as a basis for cross-correlation to the reference color by comparing the modified gamut and the reference color;
   c. determining magnitude of deviation of out of gamut source colors; and
   d. specifying a closest match in gamut color.

5. A method as claimed in claim 4 wherein the step of specifying the closest match in gamut color comprises the step of applying a nearest neighbor evaluation.

6. A method as claimed in claim 4 wherein the step of specifying the closest match in gamut color comprises the step of applying perceptual color algorithms.

7. A method as claimed in claim 4 further comprising the step of printing all possible colors, including all permutations of primary inks used to make processed colors, in equal increments and of a size easily measurable with a devise capable of converting the all possible colors into standard color coordinates.

8. A method as claimed in claim 7 further comprising the steps of: categorizing the all possible colors; and using the all possible colors to determine ability of the output device to reproduce a source color.

9. A method as claimed in claim 8 further comprising the step of identifying each color printed within a gamut of the output device.

10. A method as claimed in claim 9 wherein the step of identifying each color printed within a gamut of the output device comprises the step of correlating each color printed to independent color coordinates.

11. A method as claimed in claim 4 further comprising the step of correlating a set of source colors to a companion set of output device in gamut colors using dependent interpolated adjustment of the set of output device in gamut colors with regard to hue, saturation, and lightness.

12. A system using the method of claim 1 further comprising the step of correlating an individual color or a set of source colors with an appropriate individual or set of destination colors comprising: a database of at least one destination color gamut; means for applying predictive alteration of the at least one destination color gamut; means for interpolating the database of at least one destination color gamut and predictive alteration of the at least one destination color gamut based on digital data manipulation processes, to determine a closest match between the individual color or set of source colors and the individual or set of destination colors.

13. A system as claimed in claim 12 wherein the matching of an individual color or a set of source colors is applicable to any destination device.

* * * * *